United States Patent [19]

Fennel et al.

[11] Patent Number: 4,844,556

[45] Date of Patent: Jul. 4, 1989

[54] METHOD AND CIRCUIT CONFIGURATION FOR CONTROLLING THE WHEEL SLIP BY MEANS OF AN ELECTRONICALLY CONTROLLABLE AUTOMOTIVE VEHICLE BRAKE SYSTEM

[75] Inventors: Helmut Fennel, Bad Soden; Norbert Ehmer, Waechtersbach, both of Fed. Rep. of Germany

[73] Assignee: Alfred Teves GmbH, Frankfurt am Main, Fed. Rep. of Germany

[21] Appl. No.: 231,804

[22] Filed: Aug. 12, 1988

[30] Foreign Application Priority Data

Aug. 13, 1987 [DE] Fed. Rep. of Germany ....... 3726998

[51] Int. Cl.⁴ .......................... B60T 8/00; B60T 8/58; B60T 8/24
[52] U.S. Cl. ............................... 303/100; 188/181 R; 303/111; 364/426.01
[58] Field of Search ................... 303/100, 111, 91, 93, 303/94, 95-99, 102, 106, 103, 110, 105, 107, 108, 109; 364/426.01, 426.02, 426.03; 188/181 C, 181 R, 181 A, 112; 180/197, 244, 245

[56] References Cited

U.S. PATENT DOCUMENTS

| | | | |
|---|---|---|---|
| 3,288,232 | 11/1966 | Shepherd | 303/110 X |
| 3,659,906 | 5/1972 | Horvath | 303/100 |
| 3,797,892 | 3/1974 | Leiber | 303/100 X |
| 3,887,240 | 6/1975 | Leiber et al. | 303/111 |
| 3,910,647 | 10/1975 | Takeuchi | 303/100 |
| 3,926,477 | 12/1975 | Klatt | 303/111 |
| 3,966,264 | 6/1976 | Mattori et al. | 303/100 X |
| 4,042,059 | 8/1977 | Bertolasi | 303/100 X |
| 4,309,060 | 1/1982 | Leiber et al. | 303/106 |
| 4,480,309 | 10/1984 | Burckhardt et al. | 303/93 X |
| 4,484,280 | 11/1984 | Brugger et al. | 303/111 X |
| 4,494,801 | 1/1985 | Ohmori et al. | 303/111 X |
| 4,521,856 | 6/1985 | Phelps et al. | 303/94 X |
| 4,758,053 | 7/1988 | Yasuno | 303/100 X |
| 4,779,202 | 10/1988 | Leiber | 303/100 X |
| 4,794,539 | 12/1988 | Wallentowitz et al. | 303/100 X |
| 4,809,181 | 2/1989 | Ito et al. | 364/426.01 |

Primary Examiner—Douglas C. Butler
Attorney, Agent, or Firm—James B. Raden

[57] ABSTRACT

A method and electronic circuit for use in an automotive vehicle brake system with electronic anti-lock control and/or traction slip control is equipped with circuits for identifying a state of vehicle cornering. The slip of the controlled wheel during the time intervals in which the wheel is running stably, and the control frequency or the duration of the control cycles are measured. If the wheel slip exceeds a constant predetermined limit value or a value which depends on the velocity of the vehicle, and if, simultaneously, the control cycles are short on identification of vehicle cornering and corresponding signal is generated.

12 Claims, 2 Drawing Sheets

METHOD AND CIRCUIT CONFIGURATION FOR CONTROLLING THE WHEEL SLIP BY MEANS OF AN ELECTRONICALLY CONTROLLABLE AUTOMOTIVE VEHICLE BRAKE SYSTEM

BACKGROUND OF THE INVENTION

This invention relates to a method for controlling the wheel slip by means of an electronically controllable automotive vehicle brake system, in which electric signals representing the rotational behavior of the wheels are generated. From these signals—by means of electronic circuits—control signals are obtained for an anti-lock-controlled and/or traction-slip-controlling braking action. By comparing the rotational behavior of the wheels, vehicle cornering is identified and taken into account in controlling the braking force. Circuit configurations for implementing the method are also within the scope of this invention.

Various methods and circuit configurations are already known which provide for electronic anti-lock control and traction slip control including hydraulic or pneumatic brake systems having electronically controllable valves inserted into the pressure medium paths. In such systems, as soon as a wheel becomes unstable or shows a lock-up tendency, the braking pressure will temporarily be kept constant or reduced and will be reincreased at the appropriate time by blocking the pressure medium paths and/or by opening a pressure path from the wheel brake to an unpressurized reservoir so as to effect anti-lock control in case of panicky braking action or in case of excessive brake actuation caused by the other reasons. The necessary valve control commands for operating the system are generated from electric signals representing the rotational behavior of the individual wheels which signals are processed by electronic circuits such as microcomputers. For traction slip control, similar systems meter braking pressure into the wheel brake of the driven wheel that is spinning or tending to spin. The system also provides for engine management by reducing the engine's driving force simultaneously with metering of the braking pressure. By means of a logical combination of the information present in the form of electric signals relating to the rotational behavior of the individual wheels, the vehicle velocity etc. and by means of observation of the reaction to the braking pressure variation etc., the control unit identifies the instantaneous road conditions, the value of the friction coefficient on the right and left sides of the vehicle disregards interferential factors and meters just enough braking pressure into the individual wheel brakes so as to maintain driving stability and to achieve an effective slowing-down within a short stopping distance.

When interpreting the measured data such as velocity, deceleration and acceleration of the individual wheels and when computing the required braking pressure, it must be considered that the rotational behavior and the reaction of the wheels to pressure changes can have different causes and, thus, the measured data can be ambiguous. For instance, a high wheel slip or the lagging behind of one wheel in respect of the vehicular velocity or reference velocity can indicate an imminent lock-up. However, it also might be possible that the vehicle is in a narrow curve or is cornering wherein the wheels on the inside of the curve, in particular the turned front wheel, are moving more slowly. In order to tell one situation from the other and to be able to react appropriately to them, it is already known to insert a cornering identification device, such as that disclosed in published German Patent Specification No. P 31 27 302, into a circuit configuration of the type in question for vehicles with traction control. By means of the additional circuitry, a signal characteristic representing cornering is obtained by evaluating the sensor signals of the two non-driven wheels. To enhance driving stability in this known circuit, the driving torque of the automotive vehicle engine is reduced during cornering as soon as one of the drive wheels tends to spin and when, simultaneously, a threshold value of the vehicular velocity has been surpassed. In this system cornering identification is based only on measuring the difference in speed between the two front wheels. Without any further measurements, therefore, an unstable front wheel could incorrectly indicate that the vehicle is cornering. Thus, concerning identification is excluded during a controlled braking operation.

A circuit configuration for a slip-controlled brake system having a cornering identification circuit which adds the slip of the two wheels of one vehicle side at a time and compares them with the slip sum of the wheels on the other vehicle side is disclosed in German Published Patent Application DE-Offenlegungsschrift No. P 34 13 738. In this system, as soon as the difference in the slip sums of the two vehicle sides exceeds a limit value; there will be a temporary change in the selection criteria such as from "select-low operation" to "select-high operation" and, hence, a change in braking pressure variation. In this manner, braking pressure control will be adapted to the varying conditions of straight-forward driving and of cornering so as to maintain driving stability and steerability of the vehicle in all situations. In this circuit configuration, however, it is also impossible to exclude wrong interpretations of the measured results, for instance, in case of differences in the wheel velocities due to different scrub radii.

SUMMARY OF THE INVENTION

It is, thus, an object of this invention to overcome the described disadvantages of existing systems and to develop a method as well as a circuit configuration which allows reliable identification in various situations as to whether the vehicle is driving straight or whether it is cornering.

It now has been found that this object can be achieved in a surprisingly simple and technically advanced manner by the method according to the invention wherein for cornering identification during a control operation, the slip of the controlled wheel during the time intervals, in which the wheel is running stably, and the control frequency or the duration of the control cycles are measured and, when a high wheel slip on only one side of the vehicle is occurring simultaneously, short control cycles are evaluated as a criterion for recognizing a cornering state of the vehicle. Certain limit values which can be found empirically, or by way of computation, are predetermined for the critical wheel slip considered to be "high" and for the value of the control frequency representing a conclusion that the vehicle is cornering.

When rating anti-lock control and traction slip control, it is of great advantage to generate a signal characteristic of cornering, through which signal control can be adapted to the particular situation. Thereby, it is possible to achieve a considerable improvement in control behavior. The vehicular reference velocity to which the rotational behavior of the individual wheels are compared with can be adapted to the special conditions of cornering by means of the cornering identification signal. A so-called yawing moment reduction preventing the formation of dangerous yawing moments on roads with different frictional values on the right and left vehicle sides, which cannot be overcome by the driver's countersteering efforts, to a great extent also depends on whether the vehicle is driving straight ahead or whether it is cornering. Governing and influencing yawing moments by control thus can be improved considerably when there is an unequivocal signal permitting a clear differentiation between cornering and straight-forward driving. In other situations, cornering identification also provides for an improved control since the reference velocity which represents a reference value approximating the vehicular velocity or to an optimum wheel velocity can be adapted to the particular conditions during cornering. The knowledge of angular running of the wheels is necessary in order to establish the optimum pressure level at the front axle to achieve a short stopping distance during cornering.

BRIEF DESCRIPTION OF THE DRAWING

Further advantages, characteristics, and applications of this invention will become evident from the following Detailed Description of a Preferred Embodiment with reference to the accompanying drawings of which.

DETAILED DESCRIPTION OF A PREFERRED EMBODIMENT

Figure 1:
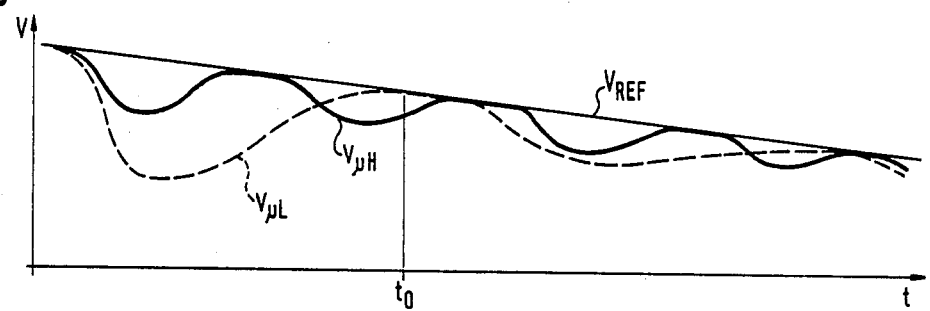
FIG. 1 is a diagram showing the velocity variation of two wheels of one axle during a controlled braking on a road having different friction coefficients on the left and right sides.

FIG. 1 illustrates the velocity variation of the two wheels of one axle during a controlled braking action in a so-called $\mu_{SPLIT}$ situation, that is, on a road having different friction values on the right and left sides of the vehicle. $V_{REF}$ represents a vehicle reference velocity. As is known, this is considered to be the reference value corresponding by approximation to the vehicle velocity or to the optimum wheel velocity during the braking operation in electronically controlled brake systems of the type in question. The velocity variation of the individual wheels are compared to this reference value for control.

The solid line in FIG. 1 represents the wheel velocity as a function of time that the vehicle wheel is running with a high friction value or friction coefficient $\mu_H$ while the broken line represents the vehicle wheel of the same axle that is running with a low friction coefficient $\mu_L$. During the braking operation which the diagram refers to the vehicle is moving straight ahead. The wheel that is running with a high friction value $\mu_H$ shows comparatively short control cycles. This is due to the fact that, under the influence of control, the wheel running with a high friction coefficient is reaccelerated relatively fast after a pressure reduction and approaches the vehicle velocity or the vehicle reference velocity $V_{REF}$. The pressure in the wheel brake of the $\mu_L$ wheel must be reduced to a lower level. Due to the worse road contact it is only possible to transmit a lesser torque to the wheel; therefore it will take longer until a stable running condition and a new acceleration of the wheel will be achieved. After reacceleration, the velocity ($V\mu_L$) of the wheel running with a low friction value or friction coefficient will again reach the reference velocity $V_{REF}$. Slip will thus become zero in the stable phase.

Figure 2:
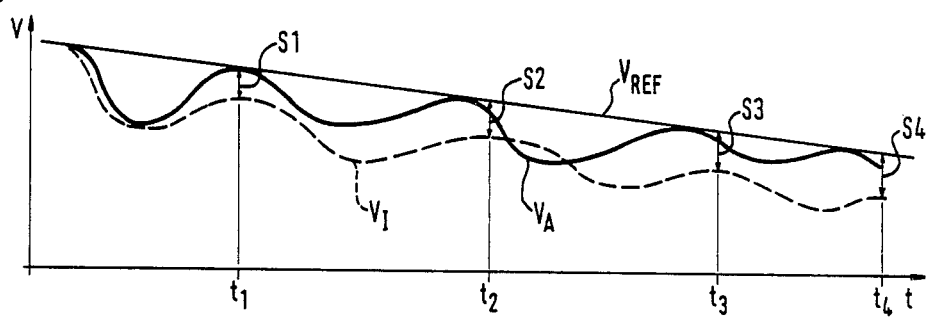
FIG. 2 is a diagram showing the wheel velocity variation during a controlled braking during cornering on a homogenous road surface.

The diagrams shown in FIG. 2 which refer to the velocity variation of the two wheels of one axle, of the front axle in this case, were traced during cornering on a homogenous, relatively high friction coefficient. The vehicle reference velocity during the controlled braking operation, which may be identical with the vehicle velocity, is symbolized by the straight line $V_{REF}$. The wheel on the outside of the curve which the solid curve $V_A$ refers to shows a similar variation as does the wheel that is running with a high friction value ($V\mu_H$) as shown in FIG. 1. The velocity variation represented by the broken line $V_I$ of the wheel on the inside of the curve which, due to the displacement of the center of gravity during cornering and due to the thus implied relief of this wheel, has worse road contact than the wheel on the outside of the curve and differs markedly from the wheel velocity ($V\mu_L$) of FIG. 1 shown by the broken line, in FIG. 1. The broken line also refers to the wheel which has the worse road contact as compared with the second wheel of the same axle. The wheel $V_i$ on the inside of the curve also shows a great deviation S1, S2, S3, S4—here defined as slip from the vehicle velocity or vehicle reference velocity $V_{REF}$ during the times $t_1$, $t_2$, $t_3$, $t_4$ or during the short time intervals in which the wheel is running stably. This is due to the fact that, when the wheels are running stably, the wheel on the inside of the curve must rotate more slowly than the wheel on the outside of the curve.

Here, the wheel velocity in the vicinity of the points $t_1$, $t_2$, $t_3$, $t_4$ or near the times where the slip becomes minimal is considered and measured as a "stable range". Strictly speaking, the phase of the stable wheel run starts a little bit earlier which, however, is of no importance for the present invention.

Further, it can be deduced from FIG. 2 that during cornering, the control cycles of the wheel with worse road contact, namely of the wheel on the inside of the curve ($V_i$), are short as compared with the control cycle(s) of the wheel ($V\mu_L$) threatened by a lock-up. The durations of the control cycles are approximately the time intervals between $t_1$ and $t_2$ or $t_2$ and $t_3$ or $t_3$ and $t_4$. The control cycles of the wheel on the inside of the curve are short as compared with the wheel running with a low friction value in a $\mu_{SPLIT}$ situation ($V\mu_L$ in FIG. 1), contrary to the control cycles of about the same or slightly shorter duration of the wheel on the outside of the curve ($V_A$) in the situation according to FIG. 2.

Figure 3:
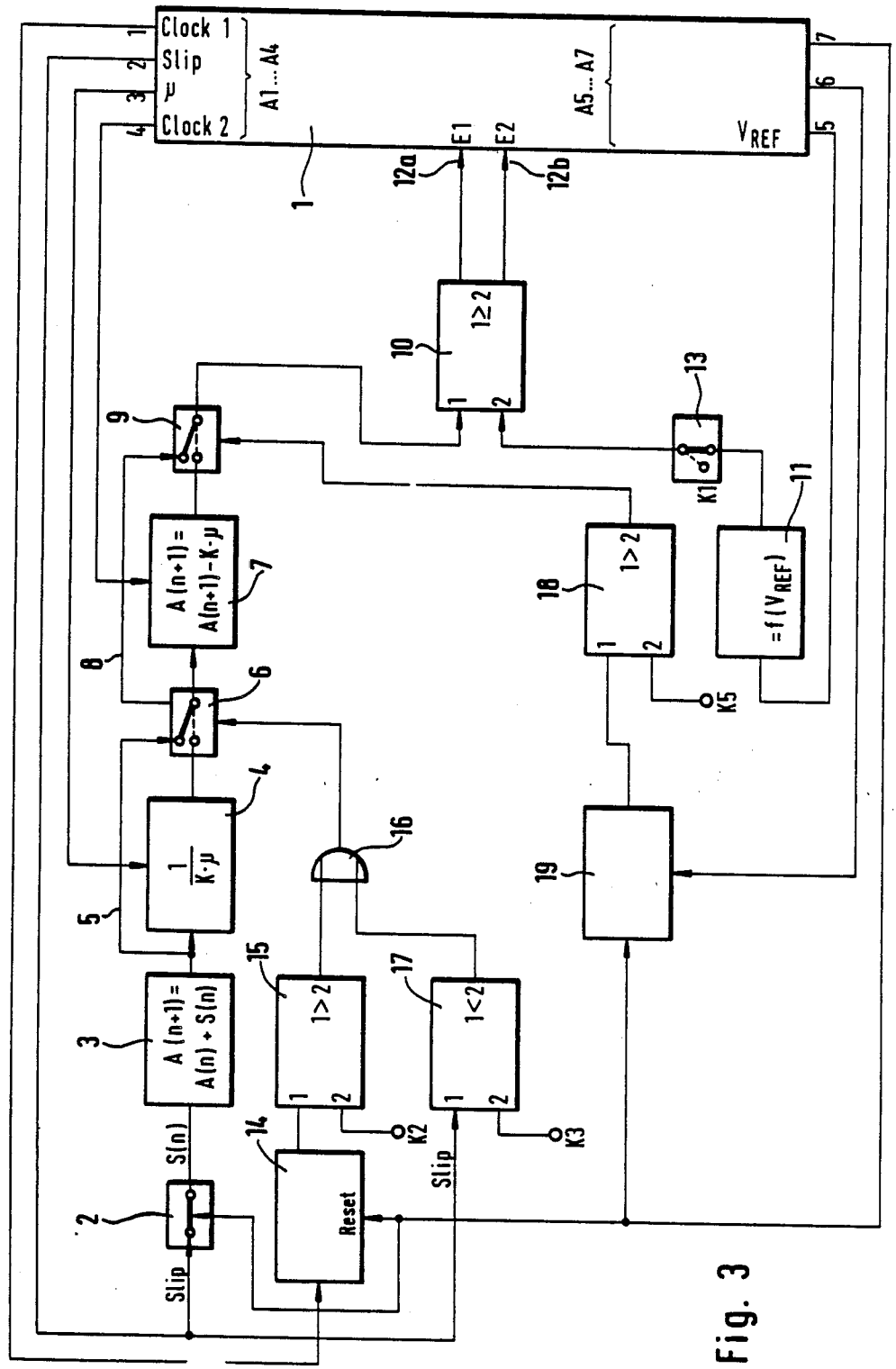
FIG. 3 is a block diagram of a circuit configuration for implementing the inventive method.

For cornering identification or for generating a control signal characteristic of cornering the inventive method makes use of the characteristic differences in the wheel velocities in the situations which are described with reference to FIGS. 1 and 2 and which until the present invention were difficult to be differentiated between and which resulted in an unfavorable control behavior. According to this invention, for cornering identification during a controlled braking operation, namely the slip S1, S2, S3, S4 (deviation of the wheel velocity from $V_{REF}$) is measured during the time intervals or times $t_1$, $t_2$, $t_3$, $t_4$ wherein the controlled wheel is running stably, simultaneously the duration of the control cycles ($t_1$ to $t_2$, $t_2$ to $t_3$, $t_3$ to $t_4$) being ascertained. A high wheel slip and, simultaneously, short control cycles—as is the case with regard to the wheel referred to by the broken line $V_I$ in FIG. 2—are evaluated and used as a criterion for identifying cornering (with a high friction coefficient). FIG. 3 shows an example of a circuit configuration for implementing this method.

An additional circuit for cornering identification is connected to an electronic control unit 1 illustrated in block diagram form and here serving both for anti-lock control and for traction slip control. Of course, the functions of this additional circuit can also be integrated into the electronic control unit or realized by a corresponding expansion of the control program of such an electronic control unit equipped with microcomputers.

The embodiment of FIG. 3 is a digital circuit configuration. The control unit 1 makes available an operating cycle at its terminal A1, a signal depending on the instantaneous wheel slip at terminal A2, a signal representing the instantaneous friction coefficient $\mu$ at terminal A3 and a second cycle for continuous reduction of the contents of an accumulator at terminal A4, which second cycle is slower as compared with the cycle at A1. At the output terminals A5 there is connected the vehicle reference velocity $V_{REF}$. "No control" is signalized by way of terminal A6 and "stable wheel run" by way of terminal A7.

A switch 2 is closed as long as the wheel runs stably and the corresponding signal is emitted by way of the output terminal A7 of the control unit 1.

By way of the switch 2, the slip signal is fed to an accumulator 3. A divider 4 is connected to the output of the accumulator 3. However, by way of a by-pass line 5 and a change-over switch 6, the output signal of the accumulator 3—in a certain operating position of the switch 6—can also directly reach a subtraction stage 7. The signal can also by-pass the stage 7 by way of the line 8 and a change over switch 9 directly to a comparator 10. The output value of the comparator 10 indicates whether the vehicle is driving straight ahead or whether it is cornering. To do this, a comparison takes place in the comparators with the output signal of a threshold value stage 11 to ascertain if the output signal of the switch 9 exceeds a limit value formed by stage 11. The output signal generated by the threshold value stage 11, namely the limit value for the response of the cornering identification circuitry, depends on the value of the reference velocity $V_{REF}$. According to another embodiment symbolized by the bridge 13, a constant threshold value K1 is predetermined instead of the output signal of stage 11 which depends on the vehicle velocity.

If the output signal of the accumulator 3, which is fed into the comparator 10 either directly or by way of the further stages, exceeds or equals the output signal of stage 11 "cornering identified" or a signal characteristic of cornering will be fed by way of output 12a into the control unit 1. Otherwise, a "straight-ahead driving" state will be signaled to the control unit over the line 12b.

A counter 14 counts the operating cycles and 13 reset each time the wheel run becomes stable at approximately time $t_1$, $t_2$, $t_3$, $t_4$ and when a corresponding signal is emitted by the terminal A7 of the control unit 1. A comparator 15 ascertains when the sum of the output of the counter 14 exceeds a predetermined fixed threshold value K2. The output signal of the comparator 15 is thus caused by the absence of the signal indicating the stable run for a relatively long time depending on the threshold value K2. This condition as represented by the output signal at the comparator 15 causes the change-over of the change-over switch 6 through an OR-gate 16 and thus connects the divider 4 into the signal path. In case of a long time interval between two times or time intervals with stable wheel run there is a high probability that the vehicle is not cornering. For instance, in case of a situation with nonhomogenous right-/left friction coefficients there is the danger of yawing moments, therefore yawing moment reduction must remain in operation. It is advantageous to correspondingly reduce the contents of the accumulator 3 so as to not reach the threshold valve representing cornering identification in the comparison of the two inputs in the comparator 10. Thus, after change-over of the switch 6, in the stage 4 the accumulator output signal is divided by a value taking into account the momentary friction coefficient $\mu$.

The output signal of a comparator 17 can also cause the change-over of the change-over switch 6 by way of the second input of the OR-gate 16. The comparator 17 compares the instantaneous wheel slip with a threshold value K3 and generates an output signal if the slip is less than the threshold value K3. If slip is very small there is little probability of cornering.

Under certain conditions which lead to change-over of the change-over switch 9, a constant amount K4 is subtracted from the signal by means of the subtraction stage 7 which was previously formed in the accumulator 3 as reduced by the divider 4. The subtraction takes place with the cycle predetermined by the output A4 of the control unit. The change-over switch 9 is actuated by the output signal of a comparator 18. The output signal will appear when the sum formed by counting the stable phases and signalized by output A7 exceeds a predetermined threshold value K5. To do this a counter 19 is provided which will be reset when "no control" is signaled by the output A7 of the control unit 1. By means of the counter 19 and the comparator 18, the change-over switch 9, and the subtraction stage 7, the sensitivity threshold for "termination of yawing moment reduction" will be reduced when many stable phases are counted during one control operation. Yawing moment reduction thus will remain active for a longer time. Yawing moment reduction above all is need in $\mu_{SPLIT}$ situations described with reference to FIG. 1 so as to not endanger the driving stability and has to be switched off during cornering.

During controlled braking in narrow curves with homogenous friction coefficients, an early switch-off of yawing moment reduction is desired while yawing moment reduction during braking on nonhomogenous friction values ($\mu_{SPLIT}$ situations) is to take place less sensitively in the curves. Therefore, after a certain number of stable phases has been reached, namely after overcoming the threshold K5, the switch 9 is changed over so that there comes about a reduction of the accumulator contents by the amount K4 with the cycle provided by output A4.

Figure 4:
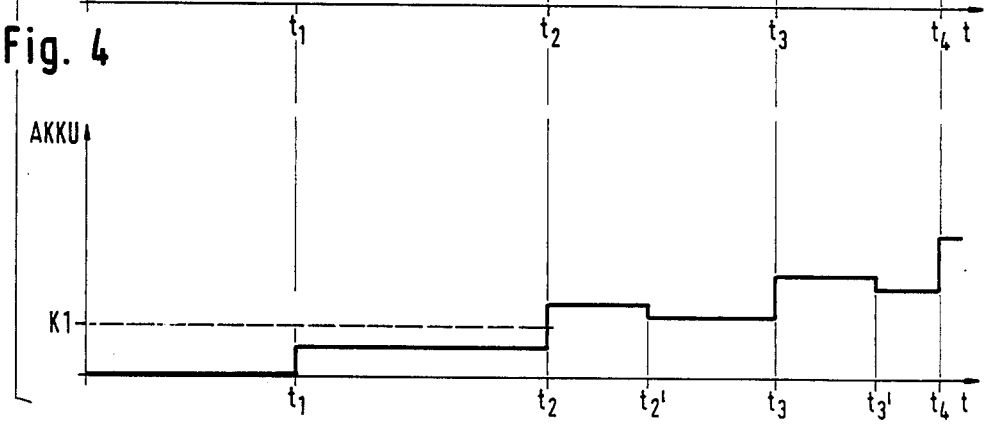
FIG. 4 is a diagram showing the variation of a signal generated by means of the circuit configuration of FIG. 3 for cornering identification during driving in a road curve.

FIG. 4 shows the variation of the accumulator contents during a braking operation, and the rotational behavior of the wheels in accordance with the diagram of FIG. 2. The signal is the signal at the input of the comparator 10. The accumulator contents are increased at the times $t_1$, $t_2$, $t_3$, $t_4$ respectively as the control unit 1 signals a stable run condition of the wheel on the inside of the curve at these times. At the times $t_2$, $t_3$ the accumulator contents are reduced by the subtraction stage 7 with the superimposed operating cycle of output A4 of the control unit 1 after the counter 19, which twice had been signaled a "stable run", had changed over the switch 9 by way of the comparator 18.

At time $t_2$, the threshold value K1, which in this case can be considered to be "connected" by the bridge 13, is exceeded and thus the signal "cornering identified" is fed to the control unit 1 by the output 12. After disconnecting the bridge 13 and after connecting the threshold value stage 11 it would also be possible to take a threshold value depending on the value of the vehicle reference velocity $V_{REF}$, instead of the threshold value K1, for the comparison and for the release of cornering identification.

The adaptation of the anti-lock or traction slip control programs to the particular conditions of cornering is effected in the control unit 1 in a manner not illustrated in more detail here.

An identical or similar circuit as the circuit illustrated in FIG. 3 is associated with each controlled wheel. The logical combination of the signals, inclusive of the cornering identification signals, takes place in the control unit 1.

The following also refers to the mode of operation of the circuit of FIG. 3 as far as it has not already become evident from the preceding description.

As soon as the stable run condition of the controlled wheel is signaled, the switch 2 will close and increase the contents of the accumulator 3 when the wheel reveals slip. The output signal of the accumulator passes or by-passes the divider 4 and the subtraction stage 7. Division depends on the magnitude of the friction coefficient. At fixed time intervals, as determined by the second operating cycle at output A4, a constant amount K4 is subtracted. By means of the counter 14, the comparator 15, the gate 16, and connection of the divider 4 by means of the change-over switch 6, the accumulated signal will be reduced when the interval between two stable wheel velocities is long and thus the possibility that cornering occurring is small. By means of the counter 19, the comparator 18, the change-over switch 9 and the subtraction stage 7, as also already described, the sensitivity threshold is reduced for the termination of yawing moment reduction during the situation of cornering.

The limit value K1 or the output signal of stage 11, which when surpassed is an identification of cornering, is either a constant predetermined value or depends on the vehicular reference velocity $V_{REF}$.

What is claimed is:

1. A method for controlling wheel slip of an automotive vehicle including an electronically controllable automotive vehicle brake system comprising generating electric signals representing the rotational behavior of the wheels, generating control signals from said electric signals by means of electronic circuit means, for effecting an anti-lock-controlled and/or traction-slip-controlling braking action, comparing the rotational behavior of the wheels to identify vehicle cornering during a control operation by measuring the slip of a controlled wheel during time intervals in which the wheel is running stably, and measuring a control frequency or duration of control cycles wherein a high wheel slip with, simultaneously, short control cycles represents an identification of a state of vehicle cornering.

2. The method as claimed in claim 1, wherein limit values are predetermined for the difference in slip values between two wheels of one axle or between two sides of the vehicle and for a critical control frequency, wherein exceeding said limit values represents an identification of a state of vehicle cornering.

3. The method as claimed in claim 2, wherein making said identification of the state of vehicle cornering, a vehicle reference velocity, represented by the velocity of the rear wheels when running stably is reduced by a value taking into account an angular running of the front wheels.

4. A circuit configuration for implementing the method as claimed in claim 3, for automotive vehicle brake systems with electronic anti-lock control and/or traction slip control comprising wheel sensors for generating signals representing the rotational behavior of the wheels, electronic circuit means for processing and evaluating the sensor signals, for vehicle cornering identification and for generating signals representative of vehicle cornering and for generating braking-force and/or traction-torque control signals, wherein said electronic circuit means for vehicle cornering identification during a control operation includes circuits for measuring the slip of a controlled wheel during time intervals during which the controlled wheel is running stably and for measuring a control frequency or a duration of individual control cycles to generate said cornering identification signal if the slip and, simultaneously, the control frequency exceed predetermined values at said controlled wheel.

5. The circuit configuration as claimed in claim 4, wherein the cornering identification signal is formed when the wheel slip or the difference in slip as compared with a second wheel of the same axle, and the control frequency exceed predetermined limit values.

6. The circuit configuration as claimed in claim 5, wherein the magnitude of the slip predetermined limit value depends on the instantaneous velocity of the vehicle.

7. The circuit configuration as claimed in claim 4, further including circuit means for reducing yawing moment, said circuits measure and compare increases in braking force or braking pressure in individual wheel brakes and stop or decelerate any further increase in said braking force or braking pressure when a measured braking force difference exceeds predetermined limit values, and said circuit means for reducing yawing moment adapted to be switched off by the signal identifying a vehicle state of cornering when said signal identifying a state of vehicle cornering exceeds a limit value.

8. The circuit configuration as claimed in claim 4, wherein said electronic circuit means is a digital circuit including at least one accumulator, the contents of said accumulator being increased proportionally to the measured wheel slip and to times of stable wheel running, said contents reduced in a predetermined cycle when the accumulator contents exceeds a limit value whereby the vehicle cornering identification signal is generated.

9. The circuit configuration as claimed in claim 8, wherein signals corresponding to the slip of the two front wheels of one axle during the times of stable wheel running are fed to the accumulator whereby when a limit value of the accumulator contents, which limit value is a constant predetermined value or a value depending on the vehicle velocity, is exceeded, a signal representing a state of vehicle cornering with a high friction value is generated, said signal causes yawing moment reduction to be switched off.

10. The circuit configuration as claimed in claim 9, wherein the electronic circuit means includes circuits for detecting the time interval between two consecutive times of stable wheel running of the front wheel on the inside of a curve whereby when a limit value of said time interval is exceeded, the accumulator contents is reduced.

11. The circuit configuration as claimed in claim 10, wherein the electronic circuit means includes circuits for detecting the velocity of the wheel on the inside of the curve whereby when the velocity difference between the two wheels of one axle drops below a limit value, the accumulator contents is reduced.

12. The circuit configuration as claimed in claim 11, wherein the electronic circuit means includes circuits which, in a case wherein different friction values exist on the left and the right sides of the vehicle reduce the switch-off sensitivity of yawing moment reduction.

* * * * *